(12) United States Patent
Clement

(10) Patent No.: US 7,726,899 B2
(45) Date of Patent: Jun. 1, 2010

(54) COUPLING DEVICE FOR THE DRIVING OF A PRINTING DEVICE CYLINDER

(75) Inventor: Philippe Clement, Penthalaz (CH)

(73) Assignee: Bobst S.A. (CH)

( * ) Notice: Subject to any disclaimer, the term of this patent is extended or adjusted under 35 U.S.C. 154(b) by 20 days.

(21) Appl. No.: 11/956,476

(22) Filed: Dec. 14, 2007

(65) Prior Publication Data

US 2008/0141876 A1  Jun. 19, 2008

(30) Foreign Application Priority Data

Dec. 14, 2006 (EP) .................................. 06025943

(51) Int. Cl.
*F16B 7/00* (2006.01)
(52) U.S. Cl. ...................... 403/301; 403/286
(58) Field of Classification Search ............ 403/221, 403/223, 286, 287, 300, 301, 335, 337; 464/182, 464/184; 101/480, 375
See application file for complete search history.

(56) References Cited

U.S. PATENT DOCUMENTS

| 1,820,750 | A | * | 8/1931 | Lord | 403/337 |
| 3,500,660 | A | * | 3/1970 | Anderson | 403/337 |
| 4,120,175 | A | * | 10/1978 | Dernedde | 403/337 |
| 4,492,583 | A | * | 1/1985 | Morrison | 464/99 |
| 5,299,880 | A | | 4/1994 | Bouchard | 403/3 |
| 6,514,147 | B2 | * | 2/2003 | Aoki et al. | 403/337 |
| 7,150,680 | B2 | * | 12/2006 | White | 464/30 |

FOREIGN PATENT DOCUMENTS

| EP | 0 384 027 | 8/1990 |
| EP | 1 719 618 | 11/2006 |
| GB | 2 082 286 | 3/1982 |

OTHER PUBLICATIONS

European Search Report dated Feb. 13, 2007 issued in corresponding European Patent Appln. No. EP 06 02 5943 filed Dec. 14, 2006.

* cited by examiner

*Primary Examiner*—Michael P Ferguson
(74) *Attorney, Agent, or Firm*—Ostrolenk Faber LLP

(57) ABSTRACT

A coupling device for driving an engraved cylinder of a printing device. The coupling device comprises a single part of chromium, nickel and molybdenum alloyed steel having undergone core hardening. The coupling device includes a central cylindrical portions, first and second flanges at the respective first and second ends of the cylindrical portion, each flange having a side portion operable to distort under stress and act as a membrane. The ratio of the difference between the diameter and the flange and the diameter of the central portion divided by the average thickness of the side portion of the flange is between 7 and 15.

5 Claims, 3 Drawing Sheets

COUPLING DEVICE FOR THE DRIVING OF A PRINTING DEVICE CYLINDER

BACKGROUND OF THE INVENTION

The present invention concerns a coupling device for driving a printing device cylinder.

Gravure printing is used particularly for high quality publishing or large print-runs in which the graphics should play a leading role to promote a product. This printing process allows, in one run, to print up to ten colors with solvent, water or other inks; to print matte, glossy or structured varnishes; to print face and/or back and to emboss.

Gravure printing is a rotary printing process used for several supports including paper or cardboard, using engraved cylinders as a printing form. In a gravure machine or printing line, a web support to be printed goes successively through printing units, wherein each printing unit carries out printing of one typical color, or varnish or the embossing.

DESCRIPTION OF THE PRIOR ART

Existing coupling devices are complicated and expensive mechanical assemblies. Despite all the care taken in their design and manufacture, these coupling devices frequently break due to undergoing stress and do not give complete satisfaction.

A connecting device is known from U.S. Pat. No. 5,299,880. The connecting device comprises a body which is an elongated hollow cylinder, a mounting flange at one end of the cylinder intended for mounting the connecting device, and a mounting flange mounted at the opposite end of the cylinder shaft. The flanges are cylindrical disks and each is positioned at a right angle to the cylinder axis.

SUMMARY OF THE INVENTION

An objective of the present invention is to remedy the reliability problems of existing coupling devices.

The present invention concerns a coupling device for driving a printing device cylinder, the device including a central cylindrical portion and two flanges disposed respectively at one and at the other of the ends of the central cylindrical portion.

The coupling device is characterized
in that it comprises a single part of chromium, nickel and molybdenum alloyed steel which has undergone a core hardening,
in that each flange includes a side having a portion which acts as a membrane, and
in that for each flange, the ratio of the difference between the diameter of the flange and the diameter of the central cylindrical portion, divided by the average thickness of the portion of the flange side, is between 7 and 15.

In this description, the printing device is defined as being a printing machine, for example in printing gravure with at least one printing unit, in flexography, in offset, in screen printing, intaglio, and still others. Differing radically from existing devices, the proposed solution is particularly simple as is the mechanical structure of the coupling device and its use. The device pursuant to the invention supports the stresses likely to the gravure printing with an excellent reliability.

BRIEF DESCRIPTION OF THE DRAWINGS

Further characteristics and advantages of the present invention will become apparent from the following description, considered with the appended drawings which illustrate schematically and by way of example an embodiment of the coupling device of the present invention, in which.

DETAILED DESCRIPTION OF THE PREFERRED EMBODIMENTS

Figure 1:
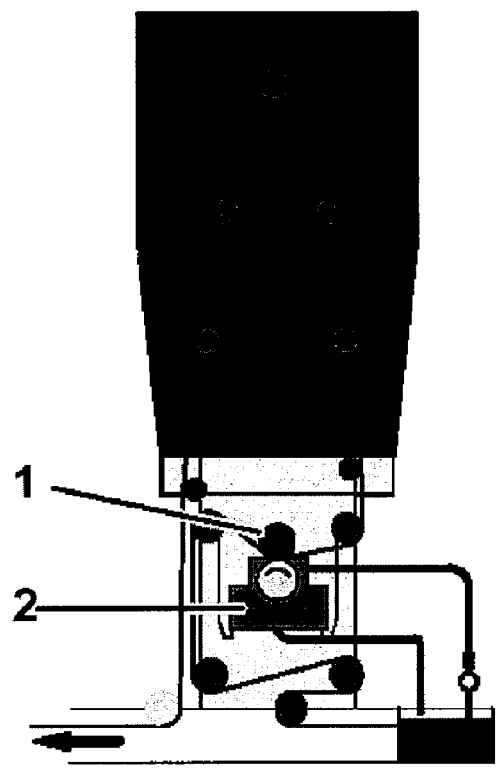
FIG. 1 is a schematic view of a gravure printing unit comprising a printing carriage.

Inside each printing unit, which is shown schematically in FIG. 1, a pressure roller (1) will strongly bear the support onto a rotatably driven engraved cylinder (3).

In order to make printing job changes easy and quick, the engraved cylinder (3) lays on rollers mounted on a carriage that is independent from the printing machine.

Figure 2:
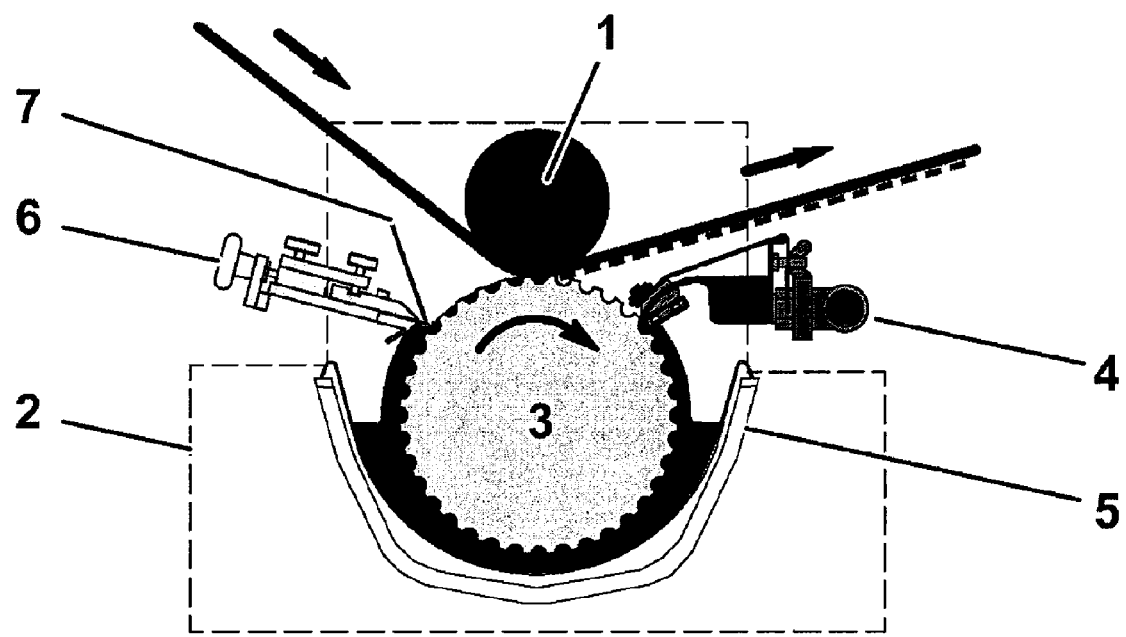
FIG. 2 is a schematic view of the printing carriage.

A gravure printing unit comprises, among others, the following elements:
a pressure roller (1) which by applying strong pressure allows the transfer of ink from the engraved cylinder cells to the printing support,
a printing carriage (2) illustrated in FIG. 2, which comprises the following elements:
an engraved cylinder (3) transferring a controlled quantity of ink from the inking system to the printing support by reproducing the pattern to be printed,
an ink applicator (4) in the form of a tank which pours the ink on the engraved cylinder (3),
an ink pan (5) positioned to collect the ink overflow,
a doctor blade (6) positioned to wipe the ink overflow from the engraved cylinder (3) by means of a blade (7),
an ink pump ensures the ink feeding from the ink tank to the ink applicator (4),
a dryer ensuring a quick evaporation of the solvents or water, or the polymerization of the UV inks.

In gravure printing, the engraved cylinder (3) is the link between the ink applicator (4) and the printing support. Its role is double as, due to the multiple cells engraved on its surface, it allows as well to transfer the ink on the printing support as to reproduce the pattern to be printed. The printing quality thus is highly dependent upon the quality of the engraved cylinders (3).

Figure 3:
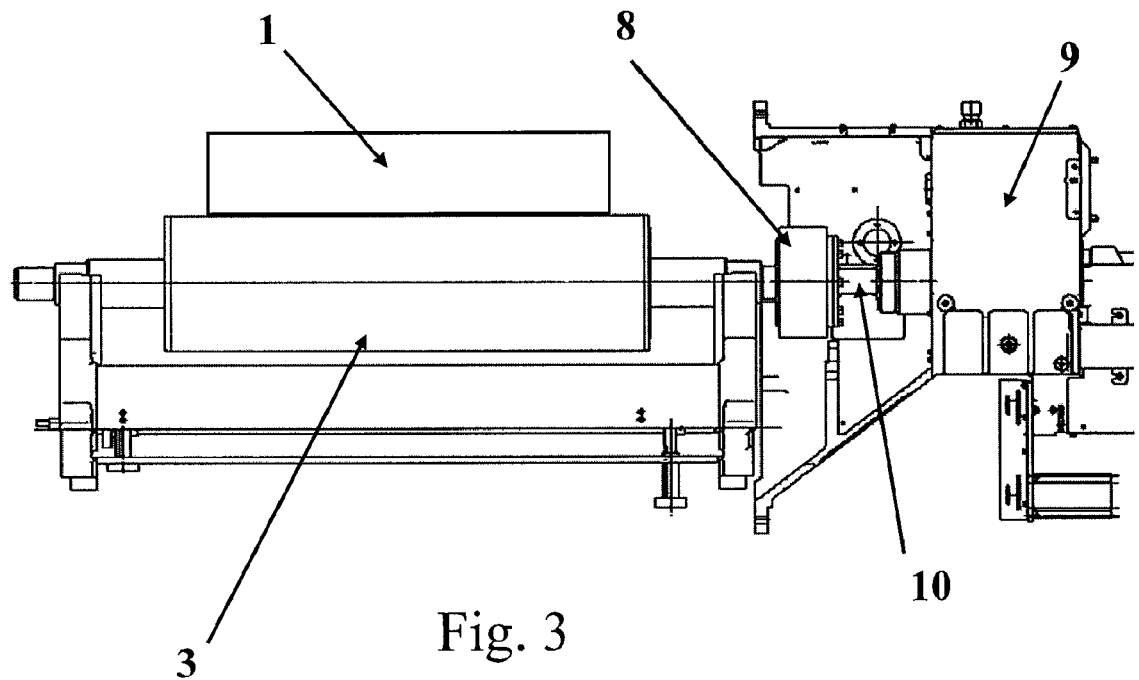
FIG. 3 shows schematically the positioning of a coupling device inside a gravure printing machine.

FIG. 3 shows a driving system of the engraved cylinder inside a printing unit. When the printing carriage (2) is installed into a printing unit, the end of the engraved cylinder (3) is clamped by a gripper (8) mounted on a coupling (10), itself being mounted on a driving box (9) installed at the rear of the printing unit. The gripper can be mechanic, pneumatic or hydraulic.

This system allows the engraved cylinder (3) to be driven, which is an essential function of a printing unit as this drive ensures the good precision of the relative positioning of the colors (which is also called the register) as well lengthwise as crosswise.

The coupling device (10) is an essential part inside this system. This device is functionally the flexible connection between the engraved cylinder (3) and its drive (9), allowing to compensate as well the mounting and machining tolerances as the distortions of the parts. The machining tolerances concern the manufacturing defects of the engraved cylinder (3). The mounting tolerances result from the printing carriages of the printing units being designed to be quickly changed, to be able to proceed to a job change as quickly as possible and to be able to clean them during a hidden period, i.e. without the cleaning time implies a stopping of the printing line.

Such a system of removable printing carriage thus involves a larger alignment error of the printing cylinder (3) with the driving box (9), and the coupling device (10) should compensate for the error.

Even then if the engraved cylinder (3) is extremely stiff, it bends under the effect of the large pressure exerted by the pressure roller (1), which implies the bending of the axis of the engraved cylinder (3), to thus deflect this axis at the end of the cylinder (3) where the gripper (8) borne by the coupling device (10) will clamp it.

Finally, the mass of the gripper (8) is of approximately 20 kg. When the gripper (8) does not clamp the engraved cylinder (3), it hangs on the coupling device (10). The coupling device (10) should then allow a rotation up to 1,000 rotations per minute without the rotation of hung on gripper (8) damaging the driving box (9).

Due to these extreme stresses, specific to gravure printing, the coupling device (10) has the following physical and mechanical features:

the coupling device (10) is stiff during rotation, to transmit the torque to the engraved cylinder (3) while ensuring an excellent quality for the lengthwise register;

the coupling device (10) is also stiff, to its X axis, to ensure an excellent quality of the sidewise register;

the coupling device (10) is less stiff, to the Y and Z axis defining the plane perpendicular to the X axis, to correct the alignment, manufacturing and the distortions of the engraved cylinder (3); it must nevertheless be enough stiff to allow a rotation when the gripper (8) does not clamp the engraved cylinder (3); and it has relatively reduced dimensions and mass.

The design and development difficulty of the coupling device (10) is that the stiffness stresses in rotation and to the X axis are opposing the low stiffness stress to the Y and Z axis.

Figure 4:
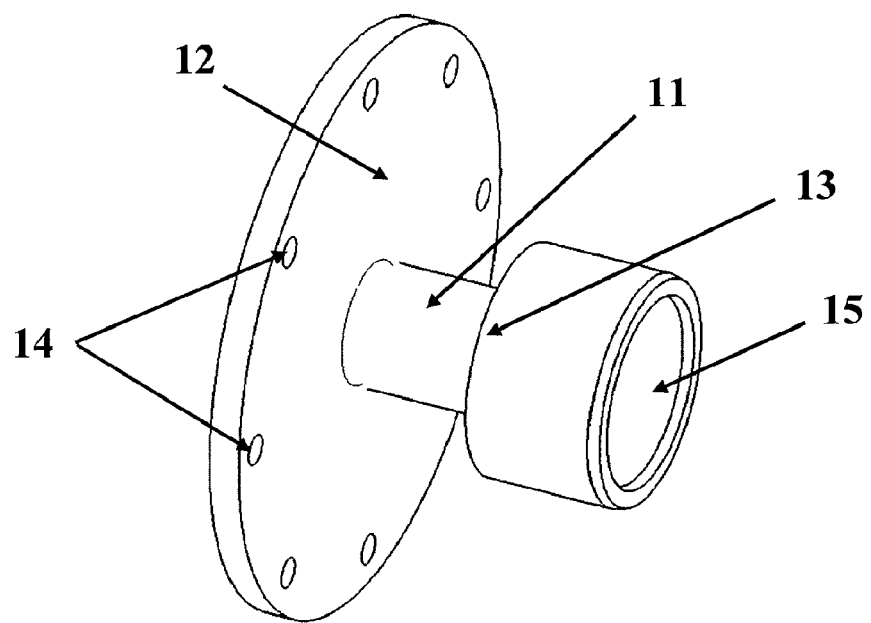
FIG. 4 is a schematic view of an embodiment of a coupling device of the invention.
Figure 5:
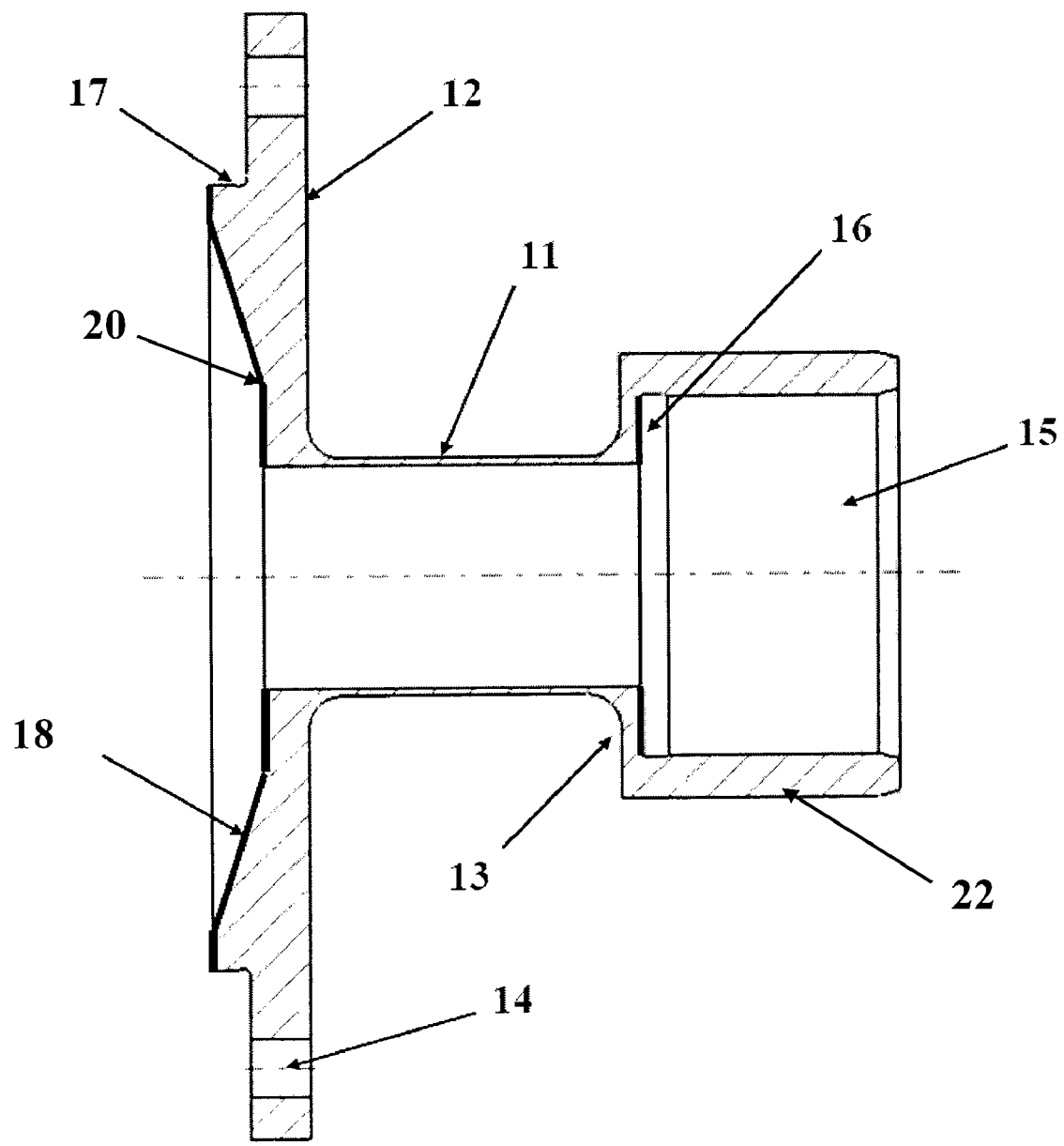
FIG. 5 is a schematic cross-section view of the coupling device embodiment of the invention shown in FIG. 4.

A coupling device (10) pursuant to the invention is shown in FIGS. 4 and 5. This coupling device (10) with a radically different design consists of a single steel part, in contrast to the complex mechanic assemblies of existing devices.

The coupling device (10) presents three essential features to ensure its functioning with high reliability and thus to undergone mechanical stresses inherent in the gravure printing:

the material of which it is formed, the treatment undergone by this material during its processing, and its geometrical shape.

The coupling device (10) of the invention is composed of a chromium, nickel and molybdenum alloyed steel which has undergone a core hardening. This material and treatment give to the device the expected mechanical and stiffness features, as well in rotation as to the X axis.

Pursuant to the invention the coupling device (10) comprises a central cylindrical portion (11) and two flanges (12 and 13) located respectively at one and at the other ends of the central cylindrical portion (11). The first of the flanges (12) is designed to support a gripper (8), which is intend to clamp the end of an engraved cylinder (3) of a gravure printing carriage. The second of the flanges (13) is designed to be linked to the shaft of a driving box (9). The first flange (12) in FIG. 4 is thus provided with openings (14) to let fixing screws (not shown) pass through, whereas the second flange (13) is provided with a bore (15) in which an expansion ring not shown will be disposed.

When the coupling device (10) is installed in a gravure printing system, it is linked on one side to a driving box (6) with the means of an expansion ring inserted and expanded in the bore (15), and linked on the other side to a gripper (8) fastened by fixing devices through openings (14) and intended to clamp the end of an engraved cylinder (3).

One portion (18, 16) of the side of each of the flanges (12 and 13), perpendicular to the central cylindrical portion (11), has a lower thickness to be able to distort under the stresses when an engraved cylinder (3) is actually be clamped by the gripper (8) and driven into rotation by the driving box (6), and the low thickness portion therefore acts as a membrane. This portion (18, 16) of the side of each of the flanges (12 and 13) has an elasticity capacity.

Portion (18) of the side of the flange acting as a membrane in the embodiment shown on FIGS. 4 and 5 for the first flange (12) is concave and includes wall 20 of varying thickness that extends from the junction with the central cylindrical portion (11) to the bearing zone (17) of the gripper (8). Side portion (16) acting as a membrane for the second flange (13) extends from the junction of the central cylindrical portion (11) to the junction with rigid cylindrical walls (22) of the bore (15). It is like to the side of the second flange (13) located inside the bore. These two portions (18, 16) are indicated by a bold line on FIG. 5.

Pursuant to the invention, when the difference for each of the flanges (12 and 13) between the diameter of the flange and the diameter of the central cylindrical portion (11) is calculated, and this difference is divided by the average thickness of the portion (18, 16) of its side acting as a membrane, the ratio thus obtained is comprised between 7 and 15.

This typical geometry allows the central cylindrical part (11) to act as a beam element embedded at each end, while moving distorts it by compensating the shift of positions to the Y and Z axis. The portions (18, 16) of the sides of both flanges (12 and 13) acting as membranes distort under dynamic stresses by correcting the angular defects due, for example, to the distortion of the engraved cylinder (3) to the Z axis or to a skewing of the engraved cylinder (3) to the Y axis.

The skewing of the cylinder (3) by moving of one of its ends to the Y axis, is sometimes used to compensate the graving as well as the parallelism defects between the engraved cylinder (3) and the doctor blade (6).

The portions (18, 16) of the sides of the flanges (12 and 13) acting as membranes do more or less strongly distort pursuant to the chosen ratio, which allows the coupling device (10) to absorb more or less stress. The ratio will be selected according to the tolerances foreseen for the considered printing system. The average thicknesses of the portions (18, 16) of the sides will moreover preferably be chosen so that stresses undergone by each flange (12 and 13) may be equivalent.

The first flange (12) in the embodiment shown in FIGS. 4 and 5 presents a recess whose only function is to reduce the average thickness of the portion (18, 16) of its side acting as membrane.

Various geometrical shapes can of course be considered, different from the one shown as an example in FIGS. 4 and 5, without departing from the framework of the invention. The device will fulfill its functions once the defined ratio will be respected, the coupling device further to the invention presents excellent reliability despite undergone stresses, once the material will conform to the one described.

A coupling device further to the invention allows solving of the technical problem of the lack of reliability of the current devices, in a particularly elegant and efficient way and in an equivalent spacing, allowing it to be used especially in replacement of the existing coupling devices on already installed printing lines.

This device is optionally hollow and as illustrated in FIG. 4, the central cylindrical portion (11) has the shape of a tube inside which the air or liquid can pass for actuating the different pneumatic elements as, for example, the gripper (8). The thickness of the wall of this tube is preferentially then comprised between 0.7 mm and 2 mm.

The present invention is not limited to the described and illustrated embodiments. Several modifications can be done without departing from the framework defined by the scope of the set of claims.

The invention claimed is:

1. A coupling device for coupling a driving box of a printing system to a gripper clamping a printing cylinder, the coupling device having a single part and comprising:
   a rigid hollow tubular central portion having an opening at a first end, an opening at a second end and a central diameter;
   a first flange disposed at the first end of the central portion transversely to the central portion, the first flange comprising a rigid bearing portion along a peripheral edge of the first flange comprising openings for receiving fixing means to connect the first flange to the gripper, a radially extending face of the first flange facing outwardly from the first end of the central portion further comprising a concave portion having a deformable first wall radially extending from the opening at the first end of the central portion to the rigid bearing portion, the deformable first wall having a varying thickness tapering radially inwardly from the rigid bearing portion to the opening at the first end of the central portion, the first flange also comprising a first diameter;
   a second flange disposed at the second end of the central portion transversely to the central portion, the second flange comprising a rigid linking portion operable to be linked to the driving box, the rigid linking portion having rigid cylindrical walls, defining a bore for connecting to a drive of the driving box the second flange further comprising a deformable second wall radially extending from the opening at the second end of the central portion to the rigid cylindrical walls, and the second flange also comprising a second diameter, the deformable first wall and the deformable second wall deforming to correct misalignment between the gripper and the driving box coupled by the coupling device, the first, second and central diameters being selected such that a ratio of a difference between either the first diameter or the second diameter and the central diameter to an average thickness of a respective deformable wall is between 7 and 15.

2. The coupling device of claim 1, wherein the coupling device is comprised of a single metal part.

3. The coupling device of claim 1, wherein the entire coupling device comprises a single part of one of chromium, nickel and molybdenum alloyed steel, which has been core hardened.

4. The coupling device of claim 1, wherein the central portion is cylindrical.

5. The coupling device of claim 4, wherein the central cylindrical portion has a wall of a thickness between 0.7 mm and 2 mm.

* * * * *